Figure 3:
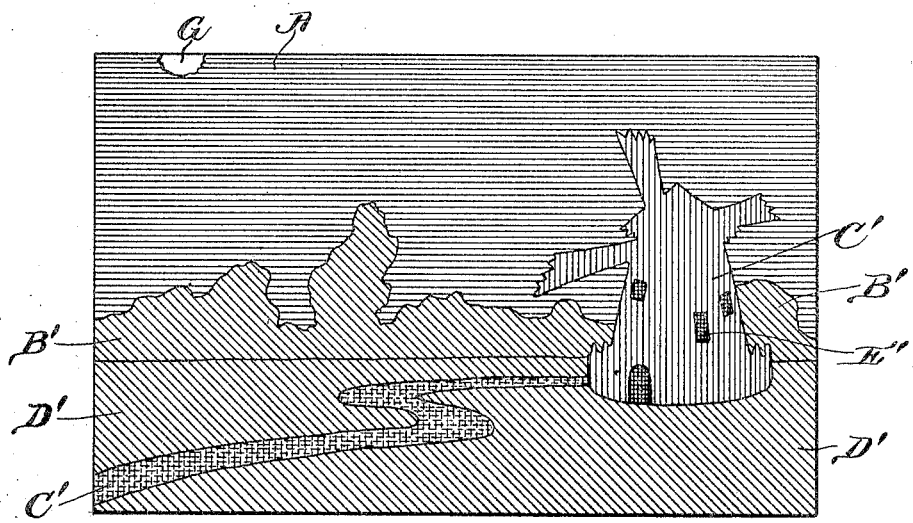

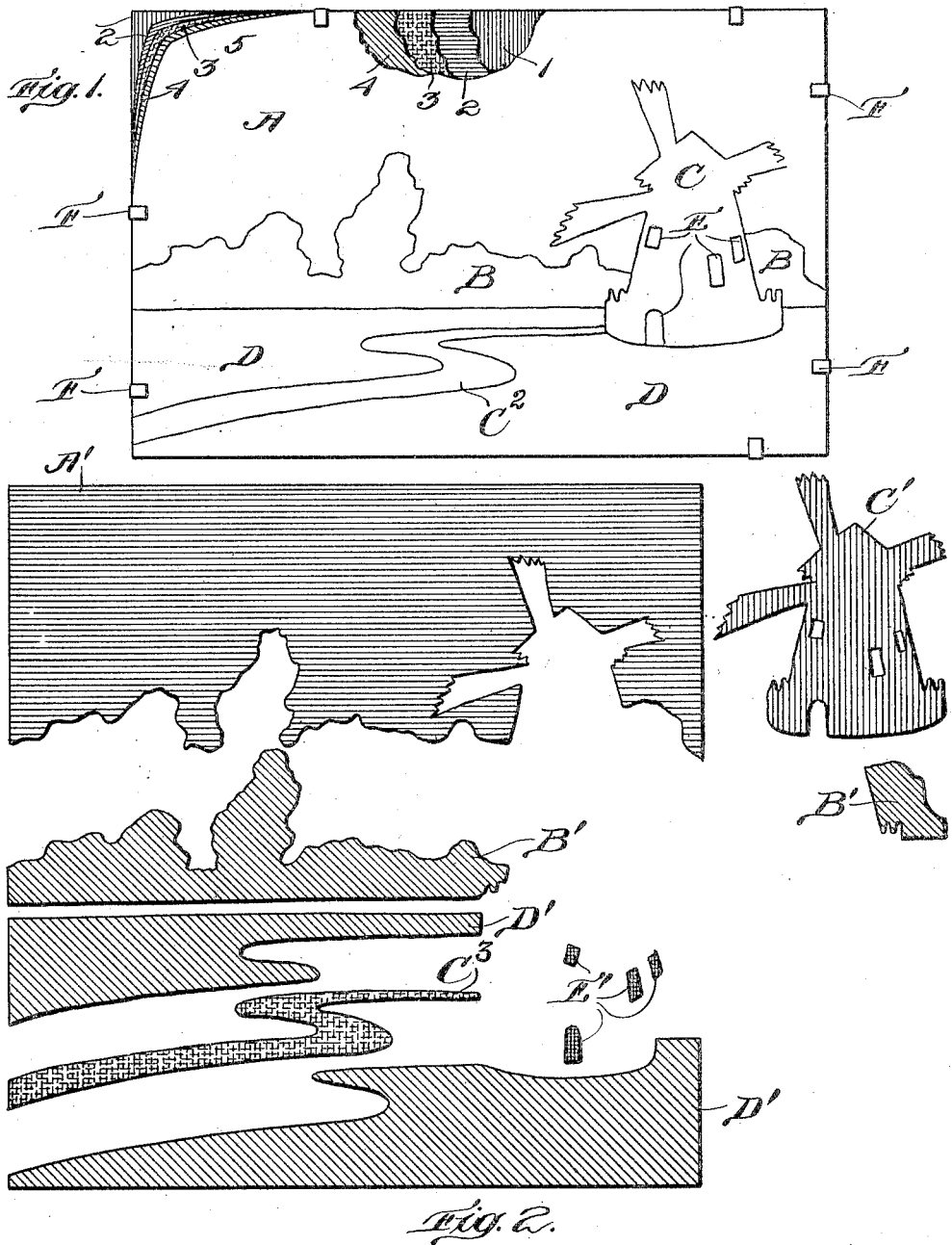

UNITED STATES PATENT OFFICE.

ELIZABETH BISSELL, OF DORCHESTER, MASSACHUSETTS, ASSIGNOR TO DENNISON MANUFACTURING COMPANY, OF BOSTON, MASSACHUSETTS, A CORPORATION OF MASSACHUSETTS.

COLOR-PICTURE AND METHOD OF MAKING THE SAME.

1,088,396.  Specification of Letters Patent.  Patented Feb. 24, 1914.

Application filed May 19, 1913. Serial No. 768,417.

*To all whom it may concern:*

Be it known that I, ELIZABETH BISSELL, a citizen of the United States, and resident of Dorchester, in the county of Suffolk and State of Massachusetts, have invented new and useful Improvements in Color-Pictures and the Method of Making the Same, of which the following is a specification.

My invention consists in a new method of making color-pictures and the product of the said method, and may be employed either for educational or amusement purposes in the kindergarten or nursery.

The method affords a means of artistic training in the elements of outline drawing and color contrast, and also possesses educational value in that it enforces observation of simple dominant elements of a color picture to the exclusion of inconsequential and unimportant details, so that in addition to giving training in the elements of drawing, outline and color-contrast this method also affords elementary training in artistic values.

In the drawings hereto annexed which illustrate my improved method and the product thereof,—Figure 1 shows in plan the arrangement of materials preliminary to the formation of mutually fitting color contrasted elements which are to be combined to form the completed picture; Fig. 2 shows in plan the mutually fitting color contrasted elements selected from the several members composing the materials shown in Fig. 1; and Fig. 3 shows the finished picture made up of the several elements illustrated in Fig. 2.

The preferred materials consist of a plurality of variously colored sheets of thin paper, 1, 2, 3 and 4, and a sheet of thicker white or plain paper 5. These sheets are superposed one upon the other and temporarily held together in register as by wire clips F, the plain or white sheet on top. Upon the plain sheet 5 there is depicted in outline a landscape or what not, wherein the several spaces defined by the outlines are to be reproduced in appropriate color by correspondingly outlined portions on the colored sheets 1, 2, 3 and 4. In making up this composite sheet of material, the sheets 1, 2, 3 and 4 will be selected with a view to providing appropriate colors for the several outlined portions of the drawing or figure represented on the sheet 5. For instance, the drawing on the sheet 5 being a landscape, the sheet 1 of tissue paper may be red to furnish the color for that element in the picture marked C in Fig. 1, which represents a mill; the sheet 2 may be blue to provide the proper color for the sky area A; the sheet 3 may be yellow to furnish the color to fill the area marked $C^2$, and the sheet 4 may be green to provide the proper color for the foliage area B and meadow area D. As shown in the drawings, but one sheet of green is provided for the foliage and meadow, but if desired one may be made light green and the other dark green by adding another sheet. The several sheets being securely clipped together, the simple outlines of the drawing on sheet 5 are cut out, the clips F removed, and the irregularly shaped portions of the several sheets sorted. By this means there will be, in addition to the portion cut from the plain white sheet 5, four colored pieces of identical shape corresponding to the surface marked A in Fig. 1, and of these four pieces obviously the blue one should be selected as a member to go into the composite picture originally contemplated. Likewise, of the several pieces having the outline of the area B, Fig. 1, that one which provides the proper dark green for foliage is selected, the pieces corresponding to the areas marked D which are light green are selected for the field or meadow in the picture, and in the same manner the red and yellow pieces corresponding in shape to the areas C and $C^2$ (Fig. 1) are set apart for use in making up the final picture. The selected colored members or elements are then fitted together and secured to a suitable supporting surface with an adhesive in such manner that each element is inclosed in or bordered by a matrix composed of the other elements. For the purpose of lending an additional attractiveness to the finished color-picture the preferred supporting surface for the several color contrasted elements will consist of a sheet of glass, as G in Fig. 3, which may be hung in a window or held up to the light so that the translucent tissue papers of which the several contrasted color elements are formed, will assume a luminosity and therefore heightened effect. If it be desired to supplement the color masses thus produced by a few details, these may be cut out of color-contrasted paper and pasted to any one of the main elements, as at the places represented by E, Fig. 1, and E', Figs. 2 and 3.

The above described method of forming a color-picture will be found to possess educational value for children for several reasons. At first the outline drawings used as guide sheets may be printed ready to hand and the children made to observe that the several outlined areas are simple and free from details of no value. Then the child may select from a supply of different colored tissue paper the colors deemed appropriate to the several areas outlined on the guide drawing. This exercise of selection cultivates imagination and increases the power of visualization. When the color sheets have been thus selected and the outlines cut in the manner above described, the selective exercise is repeated with a different aspect. The pieces into which the guide sheet has been cut may with advantage be assembled so as to restore the original print or drawing, and with this as an assistant the shapes of tissue paper corresponding to the outlined portions of the guide sheet are selected and sorted. Here the exercise involves detection of similarity in shapes irrespective of differences in color, and calls into requisition a different faculty of discrimination from that previously exercised in the selection of the various colors which are to compose the final picture. When the various pieces of tissue paper have been sorted, the exercise in color selection and picture composition is repeated, this time involving the use of memory in the selection from among the various colored pieces of each shape that color which was originally determined on for skies, foliage, field or what not. The final exercise involves manual skill and calls into requisition the coördination of muscular, tactual and visual sense. If the child commits an error at any stage of the above described process, this error will be manifested emphatically by the appearance of the finished picture, for unless the child be so unfortunate as to be color blind the appearance, for instance, of a dark green sky and light green foliage in the picture produced will probably impress itself on the child's mind so that a repetition of such an error will be highly unlikely. After exercises of this sort have been gone through with previously prepared drawings or prints, children who have acquired skill and certainty in making up composite color-pictures in this manner may be advanced to an exercise in which they produce their own guide drawings, either constructively from their own imagination, or better, by drawing from an actual landscape or life. Here the education in values is much more emphasized than before, since the tendency of the children will be to import details impossible of execution into their drawings, and a few attempts to incorporate such details will be most effective to convince the pupil of the futility of detail and the advantage of holding to simple masses of values. The process of self-education by means of the materials themselves will probably be more effective than constant supervision and precept.

It will be clear that if a sufficient number of selected colored sheets are employed, the elements cut out in the manner described may be fitted together to form a number of finished pictures all correctly colored but differing one from another. For example, if there be added to the sheets shown, sheets of gray, brown, green, black and slate, two different but correctly colored pictures may be made of the cut out elements one colored as shown in the drawings, and the other having a gray sky, a brown field, green foliage, black mill and slate path.

It will be found that children who acquire proficiency in the composition and execution of color-pictures by this method will pass very easily to the effective handling of other media, such as water colors or pastel, and the training afforded by the method above described will almost automatically train the pupil correctly in canons of simplicity and directness, in outline, drawing, perspective, discrimination of color, and sense of values.

What I claim and desire to secure by Letters Patent is:

1. The method of making color-pictures which consists in superposing a plurality of sheets of thin material, e. g. paper, of different colors, cutting through the several sheets on selected picture-outlines, and securing to a supporting surface several color-contrasted elements thus produced in relation corresponding to their mutually fitting outlines.

2. The method of making color-pictures which consists in superposing a plurality of sheets of thin material, e. g. paper, of different colors, cutting through the several sheets on selected picture-outlines, and securing to a transparent supporting surface several color-contrasted elements thus produced in relation corresponding to their mutually fitting outlines.

Signed by me at Boston, Massachusetts, this 13th day of May, 1913.

ELIZABETH BISSELL.

Witnesses:
 ETTA W. ANDERSON,
 CHARLES D. WOODBERRY.